Oct. 1, 1957   L. FEINSTEIN   2,808,524
INERTIA RESPONSIVE ELECTRO-MECHANICAL TRANSDUCER
Filed March 20, 1952

INVENTOR
LESTER FEINSTEIN
BY
ATTORNEY

United States Patent Office 2,808,524
Patented Oct. 1, 1957

2,808,524

INERTIA RESPONSIVE ELECTRO-MECHANICAL TRANSDUCER

Lester Feinstein, Bellerose, N. Y., assignor to Sylvania Electric Products Inc., a corporation of Massachusetts Application March 20, 1952, Serial No. 277,598

7 Claims. (Cl. 310—8.4)

This invention relates to electromechanical devices for translating mechanical motion or energy into equivalent electrical voltage or energy. More particularly the invention relates to transducers of the electromechanical type in which mechanical motion or energy derived from a moving body is translated into a corresponding electrical voltage. The invention relates specifically to electromechanical transducers for use in measuring displacements or accelerations of a body.

Electromechanical devices for translating mechanical displacement into equivalent electrical voltages are well known in the art, as, for example, the Rochelle salt crystal type of device which has been widely used in the electroacoustical field for translating acoustical energy into electrical energy and vice versa. More recently the electromechanical properties of certain dielectric materials have become known and fully understood. For example, ceramic materials composed principally of barium titanate, which may include certain amounts of other types of titanates, have been found to have electromechanical transducing properties. There are advantages resulting from the employment of barium titanate ceramics which make them, in many instances, desirable elements for use in an electromechanical transducer. They are particularly useful where it is important to utilize a material which is insensitive to moisture, or where it is desirable to have a material which may be polarized or made electrically sensitive to mechanical stresses to which an electrical response is desired in only one coordinate direction.

In the field of measurements, one of the most perplexing problems in instrumentation has been the provision of compact devices for providing accurate and repeatable readings of accelerations due to forces occurring in random directions in a given plane. The problem has been even more difficult of solution when measurement of acceleration forces in any given direction has been desired. Previous devices which have been built in an effort to solve these problems have not been fully satisfactory because of mechanical complications introduced by the use of segmental sensing elements disposed around the central acceleration responsive element. Such structures have been liable to the undesirable risk of the high rate of mechanical and electrical failure which is inherent in mechanically complex structures, as well as being subject to complex standardization and calibration requirements.

It is an object of the invention, therefore, to provide a new and improved electromechanical transducer.

It is another object of the invention to provide an electromechanical transducer continuously responsive to random forces in any direction in a given plane.

It is a further object of the invention to provide an acceleration sensitive device having an electrical output proportional to acceleration forces appearing in any direction in a given plane.

A still further object of the invention relates to an acceleration-sensitive electromechanical device whose electrical output is proportional to random accelerations of an object to which the device is attached.

A further object of the invention relates to mechanical simplification of acceleration sensitive devices with improved calibration accuracy.

In accordance with an aspect of the invention, the electromechanical transducer comprises a device which includes a sensitive element having piezoelectric properties and which is generally radially polarized from a central mechanical coupling orifice. The sensitive element is provided with external mounting means which generally provide support against motion of the element as a result of the application of force by a displaceable body located in the centrally located aperture. Provision is also made for connecting two electrodes on opposing surfaces of said electromechanical element, one electrode being adjacent to said mounting means and the other being adjacent to said body in said central aperture.

A better understanding of the invention and other objects thereof may be had by reference to the following description taken in connection with the accompanying drawings.

Figure 1:
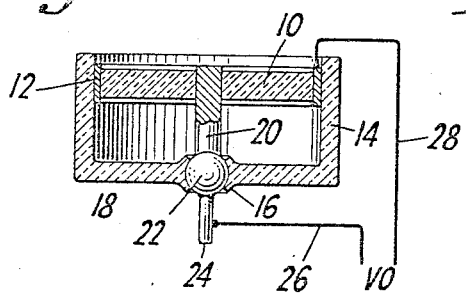
Fig. 1 is a view in cross section of one embodiment of the invention in which displacement of external bodies is coupled into the transducer for conversion into corresponding electrical voltage output.
Figure 2:
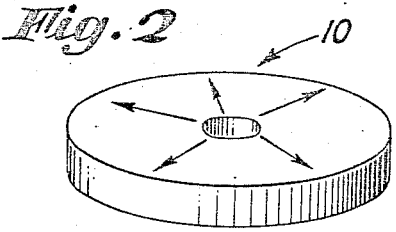
Fig. 2 is a perspective view of the crystal disc utilized in the invention as illustrated in Fig. 1, showing the crystal polarity.

Referring now to Figs. 1 and 2 of the drawings, it will be seen that the invention comprises radially polarized transducer element 10 mounted in close fitting surrounding circumferential ring 12, cup-shaped insulating support member 14 including centrally located inner spherical gimbal surface 18, and metal lever 20 having one end centrally imbedded in crystal displaceable element 10, lever arm 24 external of the cup and crystal assembly, and provided with spherical journal surface 22 gimbaled in cup 14. Electrical connection to the device is made by means of conductive leads 26 and 28 which are attached to lever 20 and to metallic surrounding ring 12, respectively. The crystal element 10 may comprise polycrystalline barium titanate. Such an element may be manufactured by mixing barium titanate with suitable additional agents for the purpose of making an easy working mixture, and by then pressing the mixture into the disc shape to be employed in the invention. In this case, the preferred form of the disc comprises a wafer of material of suitable thickness having a generally circular periphery and a generally circular central aperture having its inner wall substantially parallel to the outer wall of the disc. The mixture is then fired at an elevated temperature to produce a dense ceramic and, after cooling, is polarized by applying a voltage between uniform contacts applied to the outer and inner cylindrical surfaces of the disc while the temperature of the ceramic is raised above the transformation temperature (in the neighborhood of 120° C.). It is preferable to leave the polarizing voltage applied to the ceramic as the ceramic body is allowed to cool naturally to room temperature. The resulting ceramic has the characteristic of responding to radially applied forces; i. e., application of a force between the inner and outer surface of ceramic disc 10 will produce a voltage between electrodes connected to the inner and outer surfaces. Other types of elements having the desired radial polarization and response to radial forces may of course be utilized in the invention.

The device of Fig. 1 can be readily utilized to indicate dynamic displacements (extent of change of position) of a body moving in random direction in a given plane. By means of suitable brackets attached to cup-shaped member 14 the transducer assembly of Fig. 1 may be attached to a relatively immobile body and a mechanical connection made between the projecting lever arm 24 and the body whose dynamic displacement is to be indicated. Voltages generated by the ceramic element 10 in response to motion imparted to lever 24 are then utilized in suitable indicating equipment to indicate to the observer the extent of the displacement.

Figure 3:
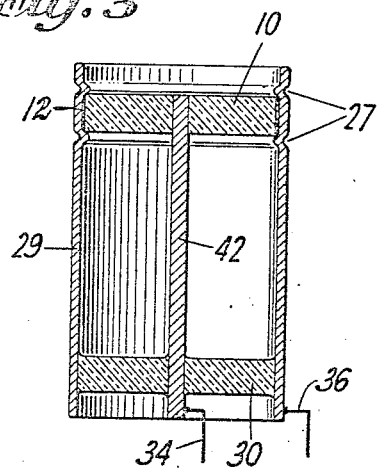
Fig. 3 is a view in cross section of an embodiment of the invention suitable for use in measuring acceleration.

Referring now to Fig. 3 in which the ceramic disc of Fig. 2 is used in a device for determining acceleration quantities, it will be seen that disc 10 is mounted in surrounding connecting ring 12 and clamped between beaded retaining rings 27 in the wall of cylinder 29 which forms a supporting sleeve for the entire assembly. Also mounted within sleeve 29, but at its other end, is insulating disc 30 which may be of glass, as illustrated, and may be held in place by conventional glass-to-metal sealing techniques. Centrally disposed and sealed within the glass disc 30 to provide a rigid mechanical support is cantilever rod 42. This rod is circular in cross section in the preferred embodiment and extends longitudinally approximately the entire length of sleeve 29 to pass through the central aperture of disc 10. As a matter of convenience, the electrical junction between the cantilever rod 42 and the central aperture of disc 10 is effected by providing an electrically conductive coating on the inner surface of the central opening. Electrical connections to this device are made to the outer cylindrical shell 29 and to the cantilever beam 42 at its point of emergence from the insulating disc 30 by means of leads 34 and 36.

For its operation as an acceleration sensitive device, the apparatus of Fig. 3 depends upon the linear lateral response of cantilever beam 42 to acceleration forces distributed along its length. The device should be mounted upon the object of which the acceleration is to be measured by means of a suitable strap or clamp attached to the casing 29 and anchored on the body whose acceleration is being measured. The accelerometer is preferably so oriented when it is mounted that the disc 10 lies in the plane of the acceleration forces to be measured, thereby assuring positioning of the cantilever beam perpendicular to the direction of motion of the body whose acceleration is to be measured. Inasmuch as the cantilever beam is proportionally sensitive in deflection to a uniform load, and inasmuch as acceleration forces are applied to the device in a plane perpendicular to the axis of the beam, it is apparent that the acceleration forces will be distributed uniformly along the length of the beam, and that the resulting beam deflection will be proportional to the acceleration. The acceleration sensitive structure thus provided has an inherent damping action due to the thickness and resilience of disc 10 bearing on the end of the cantilever beam 42. Variation in the sensitivity and critical frequency of the device may be produced by varying the dimensions of the cantilever beam 42 and varying the dimensions of the disc 10. Inasmuch as the deflection of a uniform cantilever beam 42 is linear under acceleration forces perpendicular to its axis, it is apparent that, given a linear voltage response to lateral pressure in the disc 10, the voltage output of the device will be proportional to acceleration forces applied to it.

Figure 4:
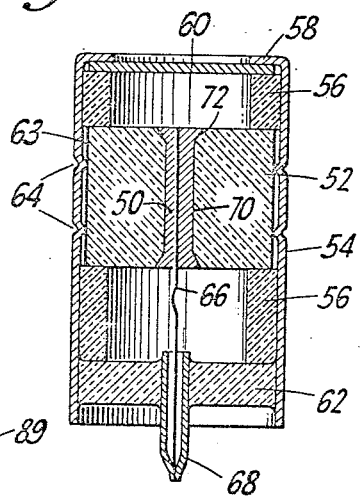
Fig. 4 is a view in cross section of another embodiment of the invention for use as an accelerometer.

Fig. 4 illustrates another embodiment of the invention adapted for the measurement of acceleration. In this embodiment use is made of free-free beam 50. (A free-free beam is one which is unsupported at either end and, consequently, has a higher natural resonant frequency.) The free-free beam 50 is retained centrally in a barium titanate ceramic disc 52 of the general character described heretofore and the disc 52 is retained in metal shell 54 by ceramic insulating rings 56 located on either face of disc 52 and held in place on the one end by pressure exerted by overturned lip 58 of shell 54 on end closure disc 60, and on the other end by the glass disc 62 which seals the opposite end of shell 54. Indentations 64 are placed in the wall of shell 54 and press against conductive coating 63 on the outer peripheral wall of disc 52 in order to retain the disc centrally in the shell, and to make contact to it. Connections to the device are made by connection to the shell 54 and by means of flexible connector lead 66 which passes into and is anchored within outlead tube 68 which, in turn, passes centrally through the end closure disc 62.

The acceleration sensitive device of Fig. 4 may be assembled in the following manner. The barium titanate cylinder or disc 52 is provided with a central aperture 70 having countersinks 72 at either end. Prior to inserting the cylinder 52 into the shell 54, the free-free body 50 is inserted into the central aperture 70. This may be done by placing the cylinder face down on a flat surface and pouring or injecting a suitable low melting point alloy such as that sold commercially as "Cerrobend" into central aperture 70. ("Cerrobend" is an alloy containing bismuth, antimony, tin and lead.) In cases where it is desired to produce an extremely small unit for use in measuring acceleration forces in highly restricted locations, it may be desirable to use a hypodermic needle and syringe to insert the "Cerrobend" into the aperture 70. The use of a low melting point material such as "Cerrobend" is preferred due to the fact that its low melting temperature will permit insertion of it into cylinder 52 after the ceramic has been polarized without disturbing the polarization, will permit handling by means of a hypodermic heated in water, and, due to the negative temperature coefficient of expansion possessed by the material, will permit the use of this characteristic to assist in locking the core in place. It should be noted that connecting lead 66 should be properly supported during pouring of the "Cerrobend" into aperture 70, so that the lead hangs centrally within aperture 70. After the "Cerrobend" has cooled in the cylinder 52, the cylinder may be inserted into sleeve 54 to seat on ceramic insulating ring 56 against glass disc 62 which has been pre-assembled into shell 54. During the insertion of ceramic cylinder 52 care should be taken to see that connecting lead 66 passes into and through connector tube 68 so that it may be clamped therein by closing the end of connector tube 68. Assembly of the accelerometer unit is completed by inserting ring 56 and cover disc 60 on the outer face of cylinder 52 and turning over the upper edge 58 of sleeve 54 to produce a compact integral retainer wall. Thereafter the indentation 64 is made in the walls of sleeve 54 in order to retain the cylinder 52 firmly in the sleeve, to further tighten the assembly, and to make good contact between shell 54 and coating 63.

In operation, the accelerometer of Fig. 4 is mounted in a manner similar to that employed in Fig. 3. It should be noted that in this case operation of the device depends entirely upon the acceleration force applied to the free body 50, and that concern should be taken to see that the disc 52 is oriented so that its axis lies perpendicular to the plane of the forces to be measured, inasmuch as radial polarity is again employed.

Figure 5:
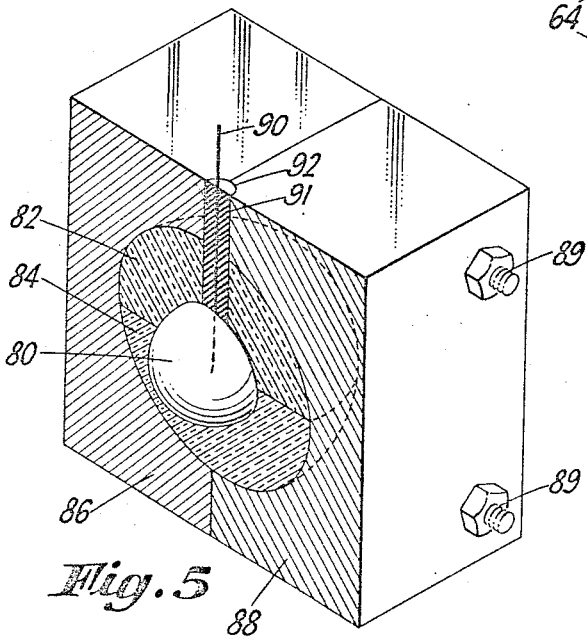
Fig. 5 is a perspective view in partial cross section of an embodiment of the invention for use as an accelerometer sensitive to accelerations in any direction.

In the view of Fig. 5, an embodiment of the invention which is useful for determining acceleration forces in any given direction is illustrated. In this embodiment a free-free body is again used, this time of spherical configuration. The free-free body 80 is cast by a method such as the hypodermic technique described previously, in the prepared hollow center of the transducer element. The transducer element in this instance may be of barium titanate as previously described. To facilitate fabrication, it is preferably cast in two halves, 82 and 84. The transducer halves 82 and 84 are supported in turn in a block comprising halves 86 and 88, which serve to provide a uniform, non-resilient support over the entire surface of the assembled transducer body. Bolts and nuts 89, passing through suitable channels in the supporting block serve to unite and retain the assembly together.

Electrical connection is made to the transducer by means of connecting lead 90 passing through cylindrical aperture 92 which is preferably filled with insulating material 91 to protect the conducting lead 90 from contact with the supporting body 86, 88 or the ceramic element 82. The second connection to the transducer element may be made by means of a conductive coating on the outside of the ceramic elements 82 and 84 or directly to the supporting body 86, 88 if it is made of a metal. It should be observed that the assembly tolerances between the sections of the transducer element 82 and 84 and the sections of the supporting body 86, 88 should be quite closely controlled in order to minimize variations in the structure and thereby minimize variations in the directional sensitivity of the device.

It is believed that the manner of utilization of the device of Fig. 5 may readily be understood from the foregoing description so it need not here again be gone into. It is apparent that since the body 80 is denser than the titanate, the device is sensitive to accelerations in any given direction, and there is no particular need to orient the device in mounting it upon the body whose acceleration is to be measured.

Some changes in the procedure employed in the assembly of the accelerometer of Fig. 4 may be employed in order to facilitate assembly of the device in Fig. 5. It may be convenient, for example, to assemble the two halves of the ceramic transducer element 82 and 84 and to cast the free-free body 80 within the assembled transducer element prior to applying heat and producing the electrical polarization required. In this situation it may be that a higher melting point alloy than "Cerrobend" can be employed. It is preferred that the entire unit be assembled prior to casting the free-free body and that a careful arrangement for suspending conductor 90 in the orifice be made prior to casting the body, as it is desirable to avoid contact of conductor 90 with the wall of the ceramic element 82 in order to avoid possible short circuiting of the element 82 and the accompanying change in electrical characteristics of the device. The aperture 92 itself should be kept as small as possible, compatible with the requirements of passage of an insulated conductor and the requirements for passage of a hypodermic needle suitable for filling the central cavity.

In conclusion, it should be observed that connections to the elements herein utilized for measuring acceleration and other forces may be most conveniently made by means of a conductive coating applied to the surface of the ceramic element on which it is desired to sense a voltage. Construction of devices according to the present invention produces structures whose characteristics do not vary appreciably with time or other conditions, whereby a stability is attained considerably greater than that attained by present devices of which I am aware. The unique nature of the polarized crystal employed permits continuous sensitivity to forces developed radially from a given point and avoids any need for deriving the proper output voltage by geometric computations depending upon the voltage output of the segmentally fabricated sensing devices such as have been previously employed. The compact simple nature of the device permits its employment in applications where it is desired to measure extremely high acceleration forces.

Other modifications within the spirit of the invention will occur to the reader and it is accordingly intended that the following appended claims should be interpreted in scope in accordance with the spirit of the invention.

What I claim is:

1. In an electromechanical device for translating mechanical energy into electrical energy, a support, a hollow body held within said support, said body being of material electrically responsive to mechanical stress and polarized radially with respect to the hollow within the body, said support resisting radial compressive forces of said hollow body, and an element of a density differing from the density of said hollow body within the hollow of said body.

2. In an electromechanical device for translating mechanical energy into electrical energy, a support, a hollow body held within said support, said body being of material electrically responsive to mechanical stress and polarized radially with respect to the hollow within the body, said support resisting radial compressive forces of said hollow body, and an element of density differing from the density of said hollow body within the hollow of said body, and in substantially overall contact with the body.

3. In an electromechanical device for translating mechanical energy into electrical energy, a support, a body bearing against said support, said body having a rectilinear opening and being of a material electrically responsive to mechanical stress and polarized radially with respect to the rectilinear opening, said support resisting forces directly outwardly from said opening, and a free-free beam fitting within the opening of the body whose major dimension is aligned with the length of the rectilinear opening.

4. In an electromechanical device for translating mechanical energy into electrical energy, a cylindrical metallic shell, a cylindrical body provided with a central axial opening supported by said shell against radial displacement, said body being of a material electrically responsive to mechanical stress and polarized radially with respect to the axial opening, an element of greater density than said cylindrical body filling said opening, and means affording electrical connection to said shell and element.

5. In an electromechanical device for translating mechanical energy into electrical energy, a support, a hollow body held within said support, said body being of material electrically responsive to mechanical stress and polarized radially with respect to the hollow within the body, said support resisting radial compressive forces of said hollow body, and an element of a density differing from the density of said hollow body within the hollow of said body, said element comprising a lever arm inserted within said body and extending therefrom to a point outside of said body.

6. In an electromechanical device for translating mechanical energy into electrical energy, a support, a hollow body held within said support, said body being of material electrically responsive to mechanical stress and polarized radially with respect to the hollow within the body, said support resisting radial compressive forces of said hollow body, and an element of a density differing from the density of said hollow body within the hollow of said body, said element comprising a cantilever beam inserted within said body and extending therefrom to a resting point on said support.

7. In an electromechanical device for translating mechanical energy into electrical energy, a support, a hollow body held within said support, said body being of material electrically responsive to mechanical stress and polarized radially with respect to the hollow within the body, said support resisting radial compressive forces of said hollow body, and an element of a density differing from the density of said hollow body within the hollow of said body, said hollow body being spherical and said element comprising a sphere confined in the spherical hollow body, with an electrical connection from the sphere to the exterior of the support.

References Cited in the file of this patent

UNITED STATES PATENTS

| | | |
|---|---|---|
| 2,250,496 | Postlethwaite | July 29, 1941 |
| 2,487,962 | Arndt | Nov. 15, 1949 |
| 2,503,831 | Mason | Apr. 11, 1950 |
| 2,518,348 | Mason | Aug. 8, 1950 |
| 2,565,158 | Williams | Aug. 21, 1951 |
| 2,565,159 | Williams | Aug. 21, 1951 |
| 2,638,556 | Hausz | May 12, 1953 |